United States Patent
Willner et al.

(10) Patent No.: US 6,512,511 B2
(45) Date of Patent: *Jan. 28, 2003

(54) HAND GRIPPABLE COMBINED KEYBOARD AND GAME CONTROLLER SYSTEM

(75) Inventors: Michael A. Willner, Mason Neck, VA (US); Scott M. Arnel, Syosset, NY (US)

(73) Assignee: Alphagrip, Inc., Mason Neck, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/883,929

(22) Filed: Jun. 20, 2001

(65) Prior Publication Data

US 2001/0045938 A1 Nov. 29, 2001

Related U.S. Application Data

(63) Continuation-in-part of application No. 09/118,886, filed on Jul. 20, 1998, now Pat. No. 6,288,709.

(51) Int. Cl.$^7$ .................................................. G09G 5/00
(52) U.S. Cl. ........................................ 345/169; 345/156
(58) Field of Search ................................ 345/156–168; 341/20, 22; 82/106

(56) References Cited

U.S. PATENT DOCUMENTS

| | | |
|---|---|---|
| 3,990,565 A | 11/1976 | Felton et al. |
| 4,360,892 A | 11/1982 | Endfield |
| 4,442,506 A | 4/1984 | Endfield |

(List continued on next page.)

FOREIGN PATENT DOCUMENTS

| | | |
|---|---|---|
| DE | 308048 | 9/1916 |
| EP | 213022 | 3/1987 |
| WO | WO 86/05143 | 9/1986 |

OTHER PUBLICATIONS

P. Kennedy, "Hand–Held Data Input Device", *IBM Technical Disclosure Bulletin*, vol. 26, No. 11, Apr. 1984, pp. 5826–5827.

"Compact Computer Keyboard", *IBM Technical Disclosure Bulletin*, vol. 27, No. 10A, Mar. 1985, pp. 5640–5642.

R. Bamford, et al., "Chord Keyboard With Case Lock And Chord Definition Features", *IBM Technical Disclosure Bulletin*, vol. 21, No. 7, Dec. 1978, pp. 2929–2932.

D. Kowalski, "Semi–Captive Keyboard", *Xerox Disclosure Journal*, vol. 1, No. 2, Feb. 1976, p. 85.

*Primary Examiner*—Steven Saras
*Assistant Examiner*—Srilakshmi K Kumar
(74) *Attorney, Agent, or Firm*—Rosenberg, Klein & Lee

(57) ABSTRACT

A hand grippable combined keyboard and game controller system (100, 100') includes a pair of housings (102 and 104). One housing (102) is provided with a first surface portion which carries a group of first control switches (114) and a hand grip portion (110) which carries a group of third control switches (118). The other housing (104) includes a first surface portion (108) which carries a group of second control switches (116) and a hand grippable portion (112) which carries a group of fourth control switches (120). The signals from the groups of first control switches (114), second control switches (116), third control switches (118), and fourth control switches (120) define all of the lowercase alphabetic characters of an alphabet, which signals are generated without the use of chording. One housing (102) is provided with a connecting portion (178, 178') and the other housing (104) is provided with a connecting portion (180, 180'), the complementary connecting portions allowing the two housings (102 and 104) to be releasably joined together, or alternately releasably coupled to an adaptor (210). The adaptor (210) provides a docking port for coupling to a palm/tablet sized computing device (10).

30 Claims, 9 Drawing Sheets

U.S. PATENT DOCUMENTS

| | | |
|---|---|---|
| 4,443,789 A | 4/1984 | Endfield et al. |
| 4,516,939 A | 5/1985 | Crimmins, Jr. |
| 4,518,164 A | 5/1985 | Hayford, Jr. |
| 4,533,446 A | 8/1985 | Conway et al. |
| 4,552,360 A | 11/1985 | Bromley et al. |
| 4,655,621 A | 4/1987 | Holden |
| 4,680,577 A | 7/1987 | Straayer et al. |
| 4,727,478 A | 2/1988 | Endfield et al. |
| 4,917,516 A | 4/1990 | Retter |
| 5,137,384 A | 8/1992 | Spencer et al. |
| 5,160,919 A | 11/1992 | Mohler et al. |
| 5,189,403 A | 2/1993 | Franz et al. |
| 5,207,426 A | 5/1993 | Inoue et al. |
| 5,317,505 A | 5/1994 | Karabed et al. |
| 5,332,322 A | 7/1994 | Gambaro |
| 5,336,002 A * | 8/1994 | Russo ................. 400/489 |
| 5,408,621 A | 4/1995 | Ben-Arie |
| 5,410,333 A * | 4/1995 | Conway ................. 345/169 |
| 5,426,449 A | 6/1995 | Danziger |
| 5,432,510 A | 7/1995 | Matthews |
| 5,451,053 A | 9/1995 | Garrido |
| 5,479,163 A | 12/1995 | Samulewicz |
| 5,481,263 A | 1/1996 | Choi |
| 5,486,058 A | 1/1996 | Allen |
| 5,493,654 A | 2/1996 | Gopher et al. |
| 5,874,906 A * | 2/1999 | Willner et al. ............ 341/22 |
| 5,984,548 A * | 11/1999 | Willner et al. ............ 400/472 |

* cited by examiner

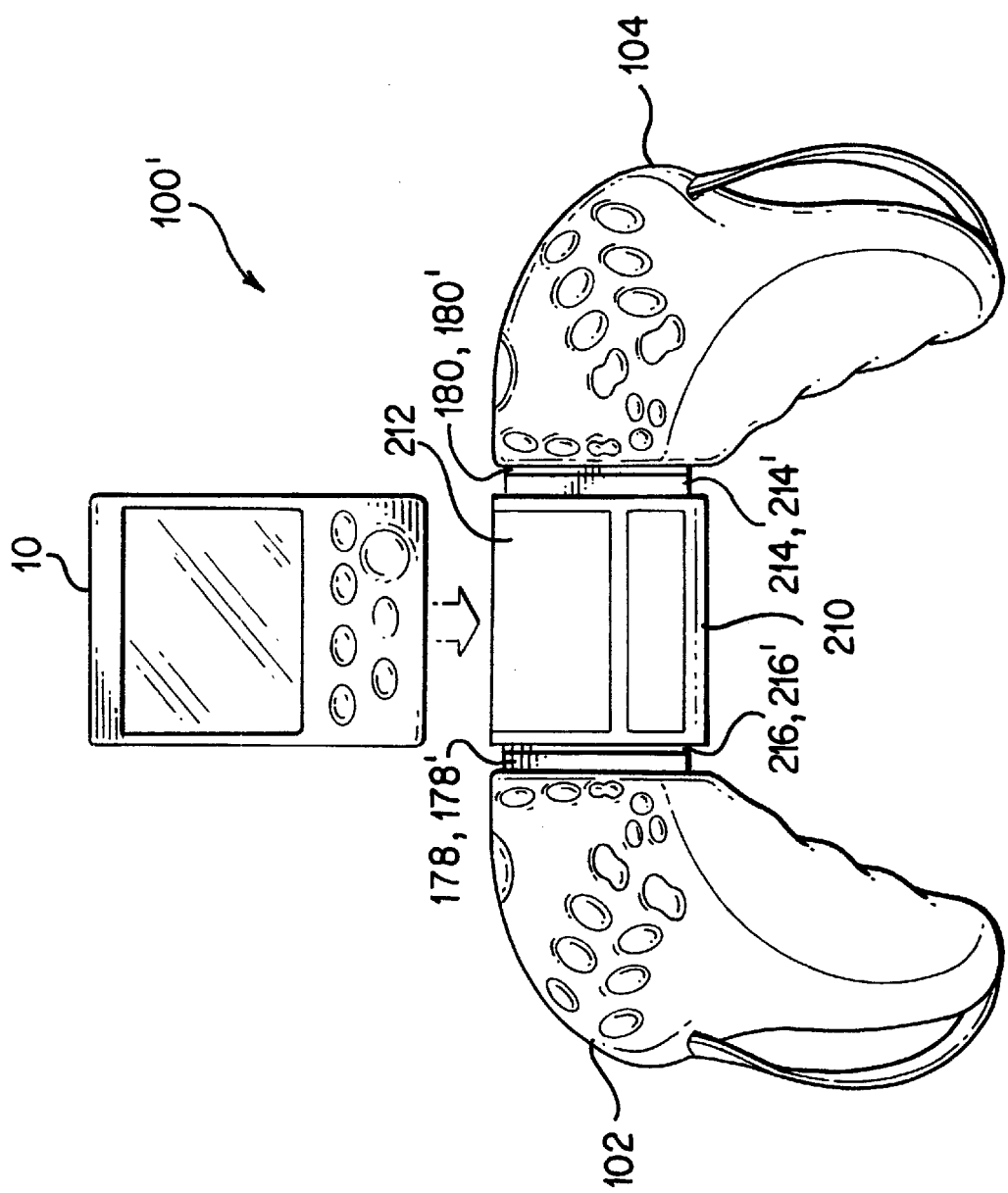

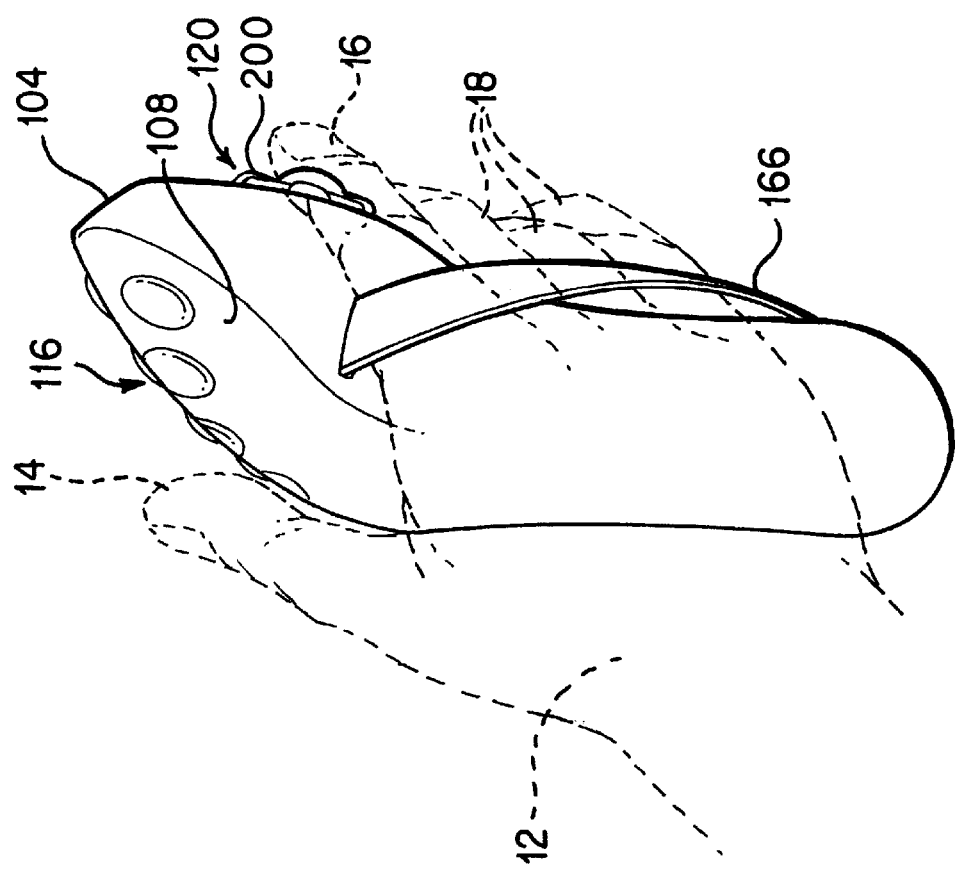

HAND GRIPPABLE COMBINED KEYBOARD AND GAME CONTROLLER SYSTEM

CROSS-REFERENCE TO RELATED PATENT APPLICATIONS

This Application is a Continuation-In-Part of patent application Ser. No. 09/118,886, filed Jul. 20, 1998, now U.S. Pat. No. 6,288,709 and entitled Hand Held Data Entry System.

BACKGROUND OF THE INVENTION

1. Field of the Invention

This invention directs itself to ergonomic keyboard systems for providing data entry to one or more devices. In particular, this invention directs itself to a hand gripable system which can function as both a pair of game controllers and as an ergonomic keyboard. Still further, this invention directs itself to a hand gripable combined keyboard and game controller system having a pair of ergonomic housings each respectively grasped by a corresponding one of a user's hands. Each of the pair of ergonomic housings includes one surface portion supporting a plurality of thumb operated controls and a hand grip portion having a plurality of finger operated controls. More in particular, this invention pertains to a hand gripable combined keyboard and game controller system wherein the thumb operated controls and the finger operated controls can be operated independently, for producing character codes that generate all of the lower case characters of an alphabet without chording. Obviously, generation of upper case characters requires the use of a SHIFT or CAPS LOCK key in combination with the key switch for a particular character. Still further, this invention is directed to a hand gripable combined keyboard and game controller system wherein the thumb operated controls of each of the housings includes a remapping control for temporarily mapping the control functions, symbols, and characters provided by one housing to the switches of the other. Additionally, each housing includes a coupling member for releasable joining one housing to the other. The hand gripable combined keyboard and game controller system further includes an adapter connectable to the coupling members of the pair of housings to receive and connect to a computing device.

2. Prior Art

Keyboard data entry systems and game controllers are known in the art. The best prior art known to the Applicants include U.S. Pat. Nos. 5,984,548; 5,874,906; 5,493,654; 5,486,058; 5,481,263; 5,479,163; 5,451,053; 5,432,510; 5,426,449; 5,408,621; 5,332,322; 5,317,505; 5,207,426; 5,189,403; 5,160,919; 5,137,384; 4,917,516; 4,655,621; 4,552,360; 4,533,446; 4,727,478; 4,680,577; 4,518,164; 4,516,939; 5,443,789; 4,442,506; 4,360,892; 3,990,565; German Patent 30804; PCT Publication WO86-05143; European Published Patent Application EP213022; the publication entitled "Semicaptive Keyboard", Xerox Disclosure Journal, Vol. 1, No. 2, February 1976, the publication entitled "Compact Computer Keyboard", IBM Technical Disclosure Bulletin, Vol. 27, No. 10A, March 1985, the publication entitled "Chord Keyboard With Case Lock And Chord Definition Features" IBM Technical Disclosure Bulletin, Vol. 21, No. 7, December 1978, and, the publication entitled "Hand-held Data Input Device", IBM Technical Disclosure Bulletin, Vol. 26, No. 11, April 1984.

Some prior art systems, such as that shown in German Patent 30804; PCT Publication WO86-05143; European Published Patent Application EP213022; the publication entitled "Semicaptive Keyboard", Xerox Disclosure Journal, Vol. 1, No. 2, February 1976, and, the publication entitled "Hand-held Data Input Device", IBM Technical Disclosure Bulletin, Vol. 26, No. 11, April 1984 are directed to keyboard systems wherein one or both of the user's hands, individually, are used for entry of alphabetic characters. Such systems disclose utilizing non-standard QWERTY keyboard formats, with some utilizing chording and others utilizing cumbersome scan and select type schemes. None of those systems provide for both gaming system signal input and alphabetic character entry. Further, where such systems utilize a pair of housings, they fail to provide for temporarily remapping of switch functions found on one housing to the switches of the other housing.

Over the years, many prior art systems have presented alternatives to the QWERTY format as a means of increasing typing speed. While those systems would permit a user to type faster, they required a user to learn the new keyboard layout. In spite of the potential typing speed increase, the public has been loath to adopt any keyboard format other than the old QWERTY arrangement. It is clear that once typists become familiar with a keyboard layout, a promised increase in typing speed is not sufficient motivation to learn an additional keyboard arrangement.

During the past decade there has been a tremendous growth in the use and ownership of computers, game software and video game systems. As a result, children and young adults have become very accustomed to handling and using game controllers that incorporate multidirectional switches. This growing portion of the keyboard-using population is more likely to adopt a keyboard format that is arranged like a game controller operated by one or both of a user's hands, can function as a game controller, is ergonomically designed, allows users to enter data while seated in a reclined position away from a desk, and may offer greater typing speed. The likelihood of the instant invention being adopted by a large segment of the keyboard-using public is further enhanced by the fact that all of the alphabetic characters of an alphabet (lower case) can be generated without the use of chording (the simultaneous operation of two or more keyboard switches).

SUMMARY OF THE INVENTION

A hand grippable combined keyboard and game controller system is provided. The hand grippable combined keyboard and game controller system includes a pair of housings each being respectively contoured to be grasped by a corresponding one of a user's two hands. Each of the housings has a first surface portion accessible to the user's thumb and a hand grip portion engageable by the user's fingers. The system also includes a plurality of first control switches disposed on the first surface portion of a first of the pair of housings for operation by a respective one of the user's thumbs to output signals representing a first portion of alphabetic characters of an alphabet. The system includes a plurality of second control switches disposed on the first surface portion of a second of the pair of housings for operation by the other of the user's thumbs to output signals representing a second portion of alphabetic characters of the alphabet. The system includes a plurality of third control switches disposed on the hand grip portion of the first housing for operation by the user's fingers of an associated hand to output signals representing a third portion of alphabetic characters of the alphabet. Each of the plurality of third control switches is disposed in correspondence with a particular one of the user's fingers of the associated hand. Still further, the system includes a plurality of fourth control switches disposed on the hand grip portion of the second housing for operation by the user's fingers of an associated hand to output signals representing a fourth portion of alphabetic characters of the alphabet. Each of the plurality of fourth control switches is disposed in correspondence with a particular one of the user's fingers of the associated hand.

It is therefore a feature of the invention to provide a pair of hand grippable controllers which together function as a keyboard capable of outputting all of the alphabetic characters of an alphabet without chording.

It is another feature of the invention to provide an easy to learn keyboard system.

It is still a further feature of the invention to provide a pair of controllers wherein the control switches of each controller can be selectively remapped to the switch functions of the other controller and thereby forming a one-handed keyboard. It is yet a further feature of the invention to include coupling members on each of the housings so that the two housings may be temporarily joined together to form a unified and integral keyboard structure.

It is an additional feature of the invention to provide an adaptor that is releasably coupled to both of the housings for communication with a computing device which is received within an opening of the adaptor.

These and other advantages and novel features of the invention will become apparent from the following detailed description when considered in connection with the accompanying drawings.

BRIEF DESCRIPTION OF THE DRAWINGS

FIG. 4 is a schematic view of the present invention incorporating an adaptor for receiving a computing device therein;

FIG. 5 is a side elevation view of the present invention depicting the placement of a user's hand on a corresponding housing;

DESCRIPTION OF THE PREFERRED EMBODIMENTS

Figure 1:
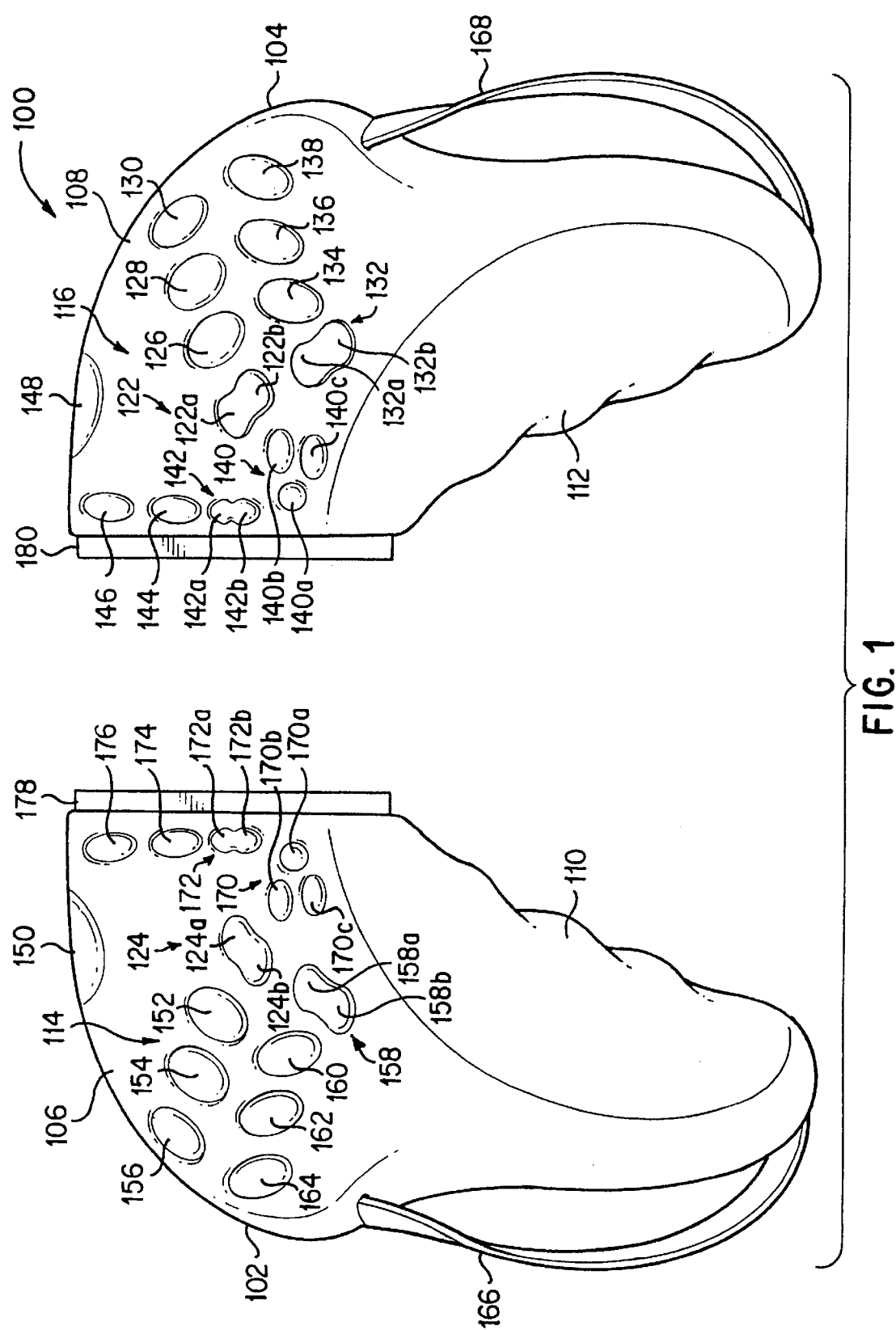
FIG. 1 is a top plan view of the hand grippable combined keyboard and game controller according to the present invention.

Referring now to FIGS. 1–3B, and 5–7, there is shown hand grippable combined keyboard and game controller system 100 which combines a pair of ergonomic housings 102 and 104 with multiple position switches to generate all of the alphabetic characters of an alphabet without the use of chording. Hand grippable combined keyboard and game controller system 100 is specifically directed to the concept of providing a keyboard data entry system which is divided into two separate and distinct housings, each operated by a corresponding hand of the user, but which may be selectively joined together to be held and easily operated by the two hands of the user. Hand grippable combined keyboard and game controller system 100 provides the functions of a fully functional 101 key keyboard for communication with a computer system 20. Further, system 100 provides the capability of communicating with the computer 20 to provide keyboard entry thereto, as well as providing an interface with the computer's mouse, and the computer's game, USB, serial, or parallel port.

Figure 2:
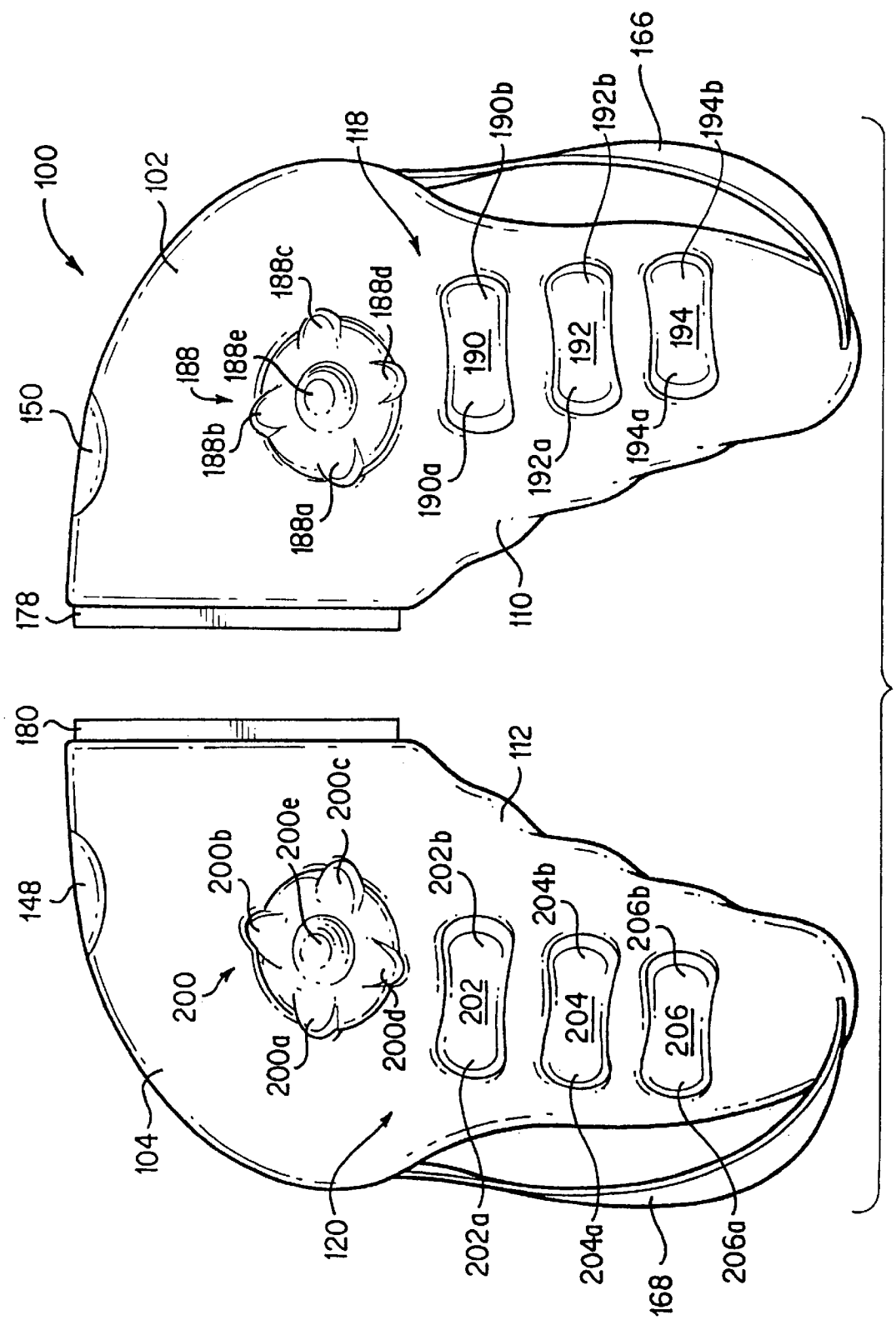
FIG. 2 is a bottom plan view of the present invention.

Referring now to FIGS. 1 and 2, hand grippable combined keyboard and game controller system 100 is packaged within a pair of housings 102 and 104. Each housing 102, 104 has a first surface portion 106, 108 accessible to a user's thumb and a hand grip portion 110, 112 engageable by the user's fingers. Each housing 102, 104 includes a strap 166, 168 to aid the user in supporting the housing 102, 104 in the user's hand. The hand grip portions 110 and 112 are each ergonomically contoured to allow the user's fingers of a corresponding hand to wrap therearound, with the distal ends of the fingers being disposed in contact with respective third control switch grouping 118 and fourth control switch grouping 120. In addition to the third control switch grouping 118 of housing 102 and fourth control switch grouping 120 of housing 104, housing 102 includes first control switch grouping 114 disposed on the first surface portion 106 and housing 104 includes second control switch grouping 116 disposed on first surface portion 108. All of the individual switches which form the first control switch grouping 114 or second control switch grouping 116 are intended to be individually operated by a respective one of the user's thumbs. While each of the housings 102, 104 are independent and separate from the other housing 104, 102, each housing 102, 104 includes a connecting portion 178, 180 for joining the two housings together.

The data entry controls of the first surface portion 106, 108 of housing 102, 104 includes three multi-position switches 124, 158, and 172, 122, 132, and 142. Each of the multi-position switches 124, 158, 172, 122, 132, and 142 is a two-position switch which may selectively be operated to provide one of two distinct outputs. Taking two-position switch 124 as an example, when the user depresses the uppermost position 124*a*, such is equivalent to depressing an individual key of a standard keyboard. When the user depresses the lowermost position 124*b*, such is equivalent to depressing a different key of a standard keyboard. Thus, each two-position switch is capable of providing two separate keystroke entries by depression of a respective one of the positions thereof. In addition to the two-position switches, the control switch groupings 114, 116 include switches 152, 154, 156, 160, 162, and 164, 126, 128, 130, 134, 136, and 138 for keyboard entry, and switches 174 and 176, 144 and 146 for gaming and control functions, and cursor controls 170, 140.

Cursor control grouping 170, 140 includes a cursor control device 170*a*, 140*a*, which is a pointing device such as a trackball or roller, a track point, a track pad, or other cursor displacement input device, and respective left and right "click" switches 170*b* and 170*c*, 140*b* and 140*c*.

The lower surface, or back side of each housing 102, 104 is provided with control switches 118, 120 that are operated by the user's fingers. The hand grip portion 110 of housing 102 is provided with a third control switch grouping 118 which includes the multi-position switches 188, 190, 192, and 194. Likewise, the hand grip portion 112 of housing 104 includes a fourth control switch grouping 120 which includes multi-position switches 200, 202, 204, and 206.

The multi-position switch 188, 200 is commonly known as a D-pad. D-pads are well-known in the game controller art, and function to provide particular contact closures depending on where the user applies pressure on the operating button thereof. When the user depresses the uppermost, or Northern position 188b, 200b of the D-pad switch button, such is equivalent to depressing an individual key of a standard keyboard. The D-pad switches 188, 200 provide five different outputs. When the user depresses the leftmost or West position 188c, 200c (with the back side shown in FIG. 2 facing downwardly), such is equivalent to a different key of a standard keyboard being depressed. When the Southern or lowermost portion 188d, 200d of the button is depressed, a separate and distinct keystroke is provided. Likewise, when the Eastern or rightmost portion 188a, 200a is operated, a fourth keystroke entry is provided. Additionally, when a central portion of the operating button 188e, 200e is depressed, an additional keystroke entry is provided. Each of the switches 190, 192, 194, 202, 204, and 206 are two-position switches, each capable of providing two distinct keystroke entries.

Each housing includes an infrared port 148, 150 through which infrared communications is provided with a receiver/interface unit. The receiver/interface unit is connected to a computing device to provide the means by which the operation of the control switch groupings 114, 116, 118, and 120 provide the keystroke and cursor inputs to the computing device. While infrared ports are shown, it should be understood that other means of wireless communications, such as radio frequency or ultrasonics, may also be utilized. It should be further understood that the coupling of system 100 with a computing device may also be provided through hard wire connections, as is well-known in the art, without departing from the inventive concepts disclosed herein.

As shown in FIG. 5, the housing 104 is ergonomically contoured to be easily grasped by the user's right hand 12. The user's thumb 14 is positioned for operation of the control switch grouping 116, while the user's fingers 16, 18 are positioned for operation of the control switch grouping 120. Obviously, the housing 102 is similarly ergonomically contoured for grasping by the user's left hand and operation of the controls thereon. As illustrated in FIG. 5, the user's forefinger 16 is positioned on the multi-directional switch 200 while the user's remaining other three fingers are respectively positioned on the remaining switches of the control switch grouping 120, as previously described. In order to permit operation of the control switch groupings 116 and 120 while supporting the housing 104, strap 166 is provided. Strap 166 engages the back side of the user's hand and provides support for the housing independently of the user's thumb 14 and fingers 16, 18.

System 100 may function as a keyboard in one mode or a game controller in another mode. To select the mode, the user utilizes the mode switch 174, 144 to change the mode of the respective signals generated by the switch groupings 114 and 118, 116 and 120. In the keyboard mode, character codes are transmitted through the infrared port 150, 148 by independent operation of any of the switches of the first control switch grouping 114 or third control switch grouping 118, second control switch grouping 116, or fourth control switch grouping 120. By use of the first control switch grouping 114, second control switch grouping 116, third control switch grouping 118, and fourth control switch grouping 120, all of the lowercase alphabetic characters of an alphabet can be generated by single individual switch operations, without resorting to chording. While the switches for output of an entire alphabet are divided between the control switch groupings 114, 118 and 116, 120 on the two housings 102 and 104, for operation by both hands of a user, each of the housings 102, 104 includes the capability of generating the entire alphabet through the use of a remapping function provided as one of the switch functions. Thus, if the user is utilizing the housing 102 and depresses the portion 124b of two-position switch 124, the alphabetic characters which normally would be produced by the switches carried by housing 104, are temporarily remapped to the switches carried by housing 102. Then, the very next key entry made produce a character which is normally assigned to the corresponding switch carried by housing 104. Subsequent to that key entry, the system reverts to the normal operation, wherein any subsequent key entry results in the alphabetic character generation normally assigned to the particular switch of housing 102. Similarly, if only the controls of housing 104 are being operated, the user need only operate the switch 122, depressing the portion 122b to temporarily remap the switches carried by housing 104 to generate a character normally assigned to the switches carried by housing 102. By this arrangement, a user, operating the controls on a single housing 102, 104, as in a game environment, can easily switch the mode of the controller for keyboard entry and utilize the switches of the one housing to enter all of the alphabetic characters of an alphabet. While such one handed key entry does not make for high speed character entry, it does add significant versatility to system 100.

Although all of the lowercase characters of an alphabet can be generated through the operation of the first control switch grouping 114, the second control switch grouping 116, the third control switch grouping 118, and the fourth control switch grouping 120, without chording, certain functions require combinational switch activation, such as producing uppercase characters, utilizing the conventional "shift" function. In addition to the uppercase shift combinational switch operation, system 100 provides for a number shift function, wherein numerical characters 0–9 may be output by operation of the number shift key switch in combination with certain other switches. Additionally, a punctuation shift key switch is provided for use in combination with other switches to generate certain punctuation and symbolic characters. However, the output of the period and comma, the two punctuation symbols having the highest usage, do not require combinational switch operation.

TABLE 1A

| Switch | High Speed Version | Remapped | Punctuation Shift |
|---|---|---|---|
| 122a | UPPER CASE SHIFT | UPPER CASE SHIFT | |
| 122b | REMAP | REMAP | |
| 126 | SPACE | 1 | |
| 128 | BACKSPACE | d | |
| 130 | ENTER | TAB | |
| 132a | PUNCTUATION SHIFT | PUNCTUATION SHIFT | |
| 132b | NUMBER SHIFT | NUMBER SHIFT | |
| 134 | v | h | DOWN ARROW |
| 136 | x | b | RIGHT ARROW |
| 138 | z | q | @ |
| 142a | START | START | |
| 142b | SELECT | SELECT | |
| 144 | MODE | MODE | |
| 146 | PAUSE | PAUSE | |

TABLE 1B

| Switch | High Speed Version | Remapped | Punctuation Shift |
|---|---|---|---|
| 158a | PUNCTUATION SHIFT | PUNCTUATION SHIFT | |
| 158b | NUMBER SHIFT | NUMBER SHIFT | |
| 124a | UPPER CASE SHIFT | UPPER CASE SHIFT | |
| 124b | REMAP | REMAP | |
| 160 | h | v | PAGE DOWN |
| 152 | l | SPACE | END |
| 162 | b | x | HOME |
| 154 | d | BACK SPACE | |
| 164 | q | z | |
| 156 | TAB | ENTER | |
| 176 | PAUSE | PAUSE | |
| 174 | MODE | MODE | |
| 172a | START | START | |
| 172b | SELECT | SELECT | |

TABLE 2A

| Switch | QWERTY Version | Remapped | Punctuation Shift |
|---|---|---|---|
| 122a | UPPER CASE SHIFT | UPPER CASE SHIFT | |
| 122b | REMAP | REMAP | |
| 126 | SPACE | l | UP ARROW |
| 128 | BACK SPACE | k | LEFT ARROW |
| 130 | ENTER | TAB | |
| 132a | PUNCTUATION SHIFT | PUNCTUATION SHIFT | |
| 132b | NUMBER SHIFT | NUMBER SHIFT | |
| 134 | v | c | DOWN ARROW |
| 136 | x | y | RIGHT ARROW |
| 138 | z | j | @ |
| 142a | START | START | |
| 142b | SELECT | SELECT | |
| 144 | MODE | MODE | |
| 146 | PAUSE | PAUSE | |

TABLE 2B

| Switch | QWERTY Version | Remapped | Punctuation Shift |
|---|---|---|---|
| 158a | PUNCTUATION SHIFT | PUNCTUATION SHIFT | |
| 158b | NUMBER SHIFT | NUMBER SHIFT | |
| 124a | UPPER CASE SHIFT | UPPER CASE SHIFT | |
| 124b | REMAP | REMAP | |
| 160 | c | v | PAGE DOWN |
| 152 | l | SPACE | END |
| 162 | y | x | HOME |
| 154 | k | BACK SPACE | |
| 164 | j | z | |
| 156 | TAB | ENTER | |
| 176 | PAUSE | PAUSE | |
| 174 | MODE | MODE | |
| 172a | START | START | |
| 172b | SELECT | SELECT | |

TABLE 3

| Switch | HIGH SPEED VERSION | REMAPPED | PUNCTUATION SHIFT | NUMBER SHIFT |
|---|---|---|---|---|
| 200a | p | g | ! | 2 |
| 200b | k | j | ^ | $ |
| 200c | t | o | ? | 4 |
| 200d | COMMA | PERIOD | UNDERLINE | COMMA |
| 200e | P-SHIFT | P-SHIFT | | |
| 202a | y | f | \| | ENTER |
| 202b | e | a | & | 6 |
| 204a | u | m | > | 0 |
| 204b | I | n | < | 8 |
| 206a | w | c | / | \ |
| 206b | s | r | APOSTROPHE | 0 |
| 194a | r | s | ] | 9 |
| 194b | c | w | [ | = |
| 192a | n | I | } | 7 |
| 192b | m | u | { | - |
| 190a | a | e | ) | 5 |
| 190b | f | y | ( | 29 |
| 188a | o | t | ' | 3 |
| 188b | j | k | ~ | # |
| 188c | g | p | " | 1 |
| 188d | PERIOD | COMMA | % | . |
| 188e | P-SHIFT | P-SHIFT | | |

TABLE 4

| Switch | QWERTY VERSION | REMAPPED | PUNCTUATION SHIFT | NUMBER SHIFT |
|---|---|---|---|---|
| 200a | u | f | ! | 2 |
| 200b | m | g | ^ | $ |
| 200c | n | t | ? | 4 |
| 200d | h | r | UNDERLINE | COMMA |
| 200e | P-SHIFT | P-SHIFT | | |
| 202a | COMMA | d | \| | ENTER |
| 202b | i | e | & | 6 |
| 204a | PERIOD | w | > | 0 |
| 204b | o | s | < | 8 |
| 206a | b | q | / | \ |
| 206b | p | a | APOSTROPHE | 0 |
| 194a | a | p | ] | 9 |
| 194b | q | b | [ | = |
| 192a | s | o | } | 7 |
| 192b | w | PERIOD | { | - |
| 190a | e | i | ) | 5 |
| 190b | d | COMMA | ( | 29 |
| 188a | t | n | ' | 3 |
| 188b | g | m | ~ | # |
| 188c | f | u | " | 1 |
| 188d | r | h | % | . |
| 188e | P-SHIFT | P-SHIFT | | |

Tables 1A and 1B identify the alphabetic characters, functions, and certain selected symbols generated utilizing the user's right and left thumbs, respectively. Table 3 identifies the alphabetic characters, functions, and selected symbols generated utilizing the fingers of the user's right and left hands. The correspondence between particular characters and the location of the corresponding switch has been developed to maximize typing speed, considering such factors as the frequency of occurrence of individual letters in the English language, and the dexterity of the particular finger which would be assigned to operating the associated switch. As can be seen from the Tables, each switch has an associated character, function, or symbol associated therewith, identified in the column marked "High Speed Version". The column identified as "Remapped" indicates the correspondence between the generated character, function or symbol when the remap function is enabled. The column identified as "Punctuation Shift" indicates the generated function or symbol generated when the punctuation shift key is utilized in combination with the corresponding switch identified in the leftmost column. Table 3 includes an additional column identified as "Number Shift" which indicates the numeric characters, symbols and functions associated with the switches operated by the user's fingers. Although not exemplified in that Table, the generation of numeric characters and symbols can also be subject to remapping, so that a single housing may be utilized to generate all of the characters, functions and symbols normally generated through the use of both housing 102 and housing 104.

In the game controller mode, each of the first control switch grouping 114 and third control switch grouping 118, and the second control switch grouping 116 and the fourth control switch grouping 120 provide switch closure input signals that are output to a computer's game port, serial port, USB port, or parallel port, or may be coupled to an input port of a dedicated gaming system. The multi-directional switches 188 and 200 may be utilized for inputting cursor control type inputs, or alternately particular switches of the control switch grouping 114, 116 may be utilized to provide directional inputs to the game software. Alternately, the cursor control grouping 140, 170 could be utilized as directional inputs to a game. Other switches of the switch groupings 114, 116, 118, 120 can be utilized for input of individual switch closures that are used by the game software to control the firing of weapons and/or provide control of particular manuevers of the game icons, such as jumping, flying, and the like.

While the character assignments defined in Tables 1A, 1B, and 3 provide for high speed character input, it is expected that there will be many current "touch typists" who will not wish to learn the new keyboard layout of system 100. Therefore, it is contemplated that a QWERTY compatible key assignment may also be made available. The QWERTY compatible key assignments may be stored in a non-volatile memory and selectively activated by utilization of a switch or combination of switches. For instance, simultaneous operation of the mode and pause switches 144, 146 or 174, 176 can provide a change from one key assignment scheme to the other. The QWERTY compatible key assignments is shown in Tables 2A, 2B, and 4. Table 2A and 2B identify the characters, functions, and symbols generated by the user's thumbs, while Table 4 illustrates the characters, functions, and symbols generated utilizing the user's fingers. As in the high speed version, each of the housings carries a key switch which is assigned to the remapping function, so that all of the characters of the alphabet can be generated utilizing the switch groupings carried by a single housing. Certain switch functions are assigned to particular keys which do not change, irrespective of which key assignment version is utilized in the keyboard mode and remain the same whether the system is in the keyboard mode or the game controller mode. Such functions are the START, SELECT, MODE, and PAUSE functions.

The START and SELECT functions, switches 142a and 142b, 172a, 172b are functions primarily utilized in the game controller mode, for starting a particular game or selecting a particular function from a menu of the game. The mode function, switch 144, 174 switches system 100 between the keyboard and game controller modes, and obviously must be present in each of those modes. The PAUSE function, switch 146, 176 is functional in both the keyboard and game controller modes. In the game controller mode, the PAUSE function performs the traditional function of halting the operation of a game until subsequently activated again by a second operation of the PAUSE switch. In the keyboard mode, the PAUSE function disables the generation of the signals normally associated with operation of all of the other switches. That allows the user to lay the housing 102, 104 down on a supporting surface, such as a table top, chair or the like, without any concern that a particular switch may be inadvertently operated by such placement and cause erroneous data to be input to the computer or gaming system. When the user wishes to resume inputs to the computer or gaming system, the PAUSE switch is again operated, to then enable the generation of the characters, functions, symbols, or switch closures normally associated with the operation of the switches carried by the particular housing.

Although not shown, each of housings 102 and 104 includes a battery compartment which contains the power source for operation of the circuitry associated with converting the switch closures to particular computer input signals. Such batteries may be of the rechargeable type, in which case a charging jack is also installed and accessible external to the housing 102, 104. Also not shown, is a power switch associated with each housing 102, 104 to enable the circuits thereof. Such a switch may be provided at any convenient location or functionally provided by means of automatic circuitry known in the art, which "turns off" the circuitry associated with a particular housing 102, 104 after a particular time period of non-use. Such automatic power control may be triggered to the "power on" state by the physical displacement of the housing 102, 104, as sensed by a position sensitive switch, such as a mercury switch, or alternately by actuation of any of the switches carried by the particular housing.

Figure 6:
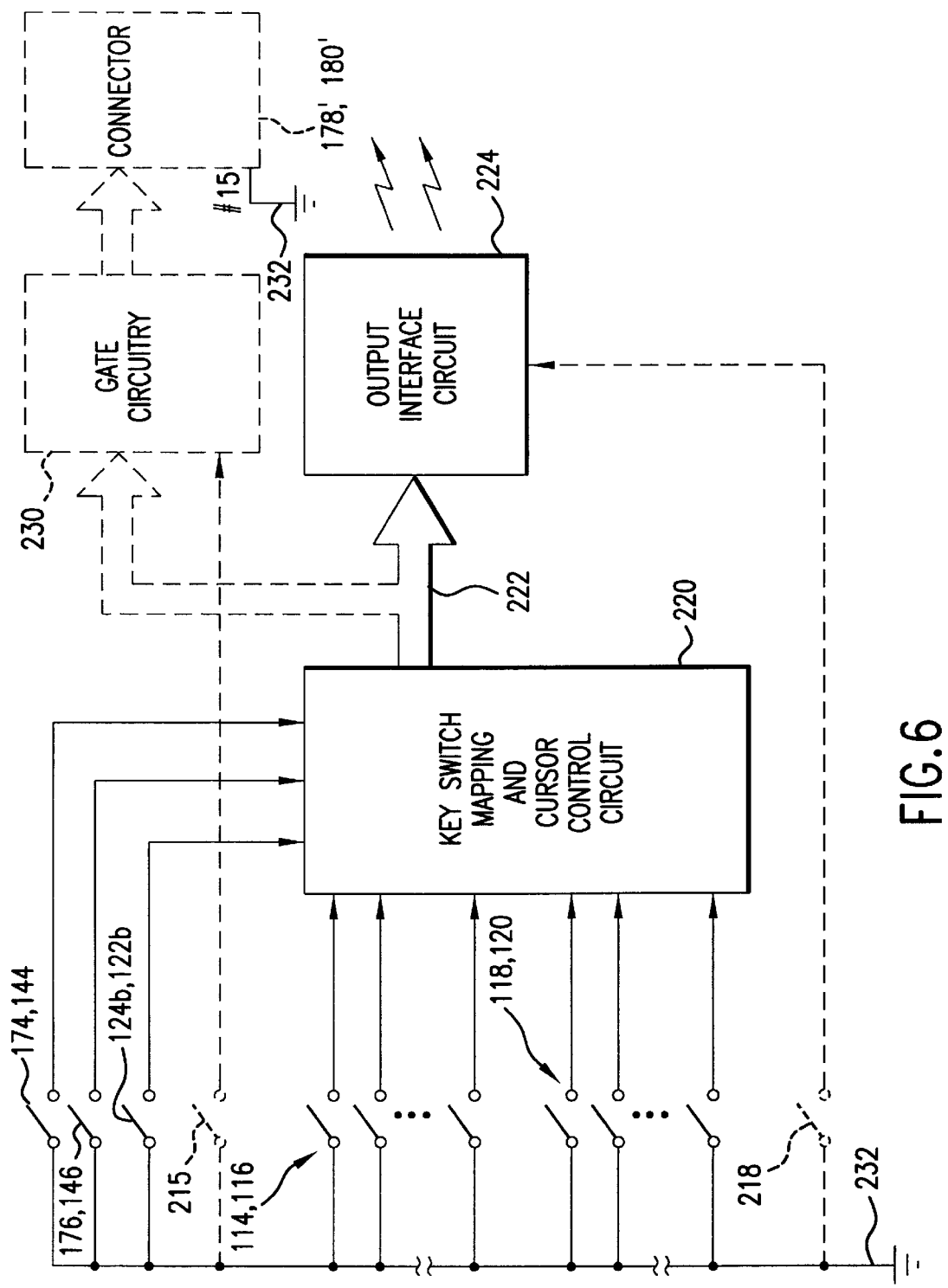
FIG. 6 is a circuit block diagram of the output circuitry of the present invention.

A block diagram of the circuit arrangement for coupling switch closures of the first control switch grouping 114 and the third control switch grouping 118, or the second control switch grouping 116 and the fourth control switch grouping 120 to the output interface is shown in FIG. 6. As the coding circuitry for converting individual switch closures into the digital character codes utilized by most computers are well-known, as are the codes and coding circuitry utilized for optical wireless transmission, such circuitry is not detailed herein.

The switches of the first control switch grouping 114, second control switch grouping 116 and third control switch grouping 118, fourth control switch grouping 120 are coupled to a respective key switch mapping and cursor control circuit 220 which converts the switch closure inputs to the appropriate digital codes that are coupled to the output interface circuit 224 through a digital bus 222. The key switch mapping and cursor control circuit 220 is controlled by input from the mode selection switch 174, 144, the PAUSE switch 176, 146, and the remapping switch 124b, 122b, as previously described. It is also noted that control functions can be achieved by a combination of multiple switch closures, such as simultaneous operation of both the MODE and PAUSE switches 174, 144, and 176, 146 to change key switch assignments between a high speed typing version and a QWERTY compatible version. The digital coded output of circuit 220 is coupled to the output interface circuit 224 for coupling to a computing device. For communication with the computing device by infrared wireless transmission, the output interface circuit 224 includes an infrared optical transmitter. Where a hard wire interface is provided, the circuit 224 would include the necessary line drivers. Therefore, the output interface circuit 224 includes those circuit components required by the type of output coupling being utilized, optical, radio frequency, ultrasonic, direct connection, etc. Additional switches and circuitry may optionally be provided, as will be described in following paragraphs.

Figure 3A:
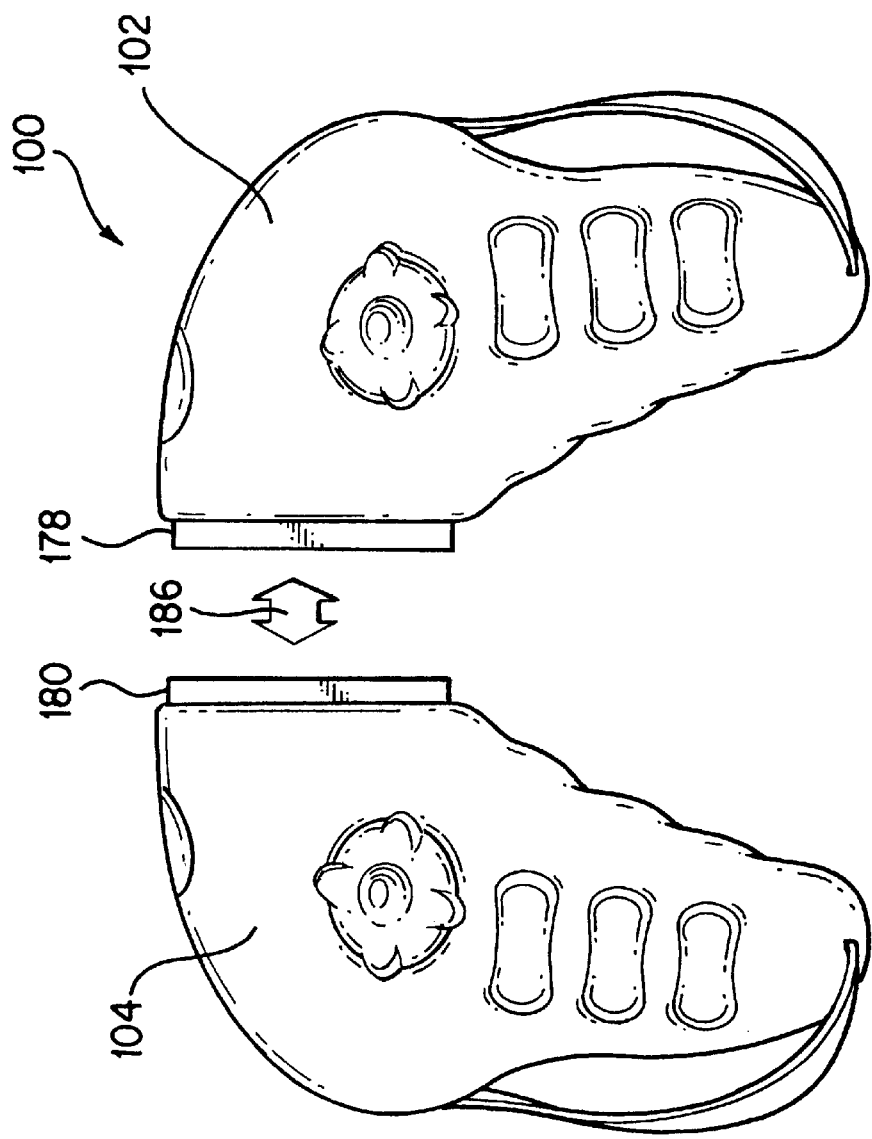
FIG. 3A is a bottom plan view of the present invention indicating the method of joining the pair of housings thereof.
Figure 3B:
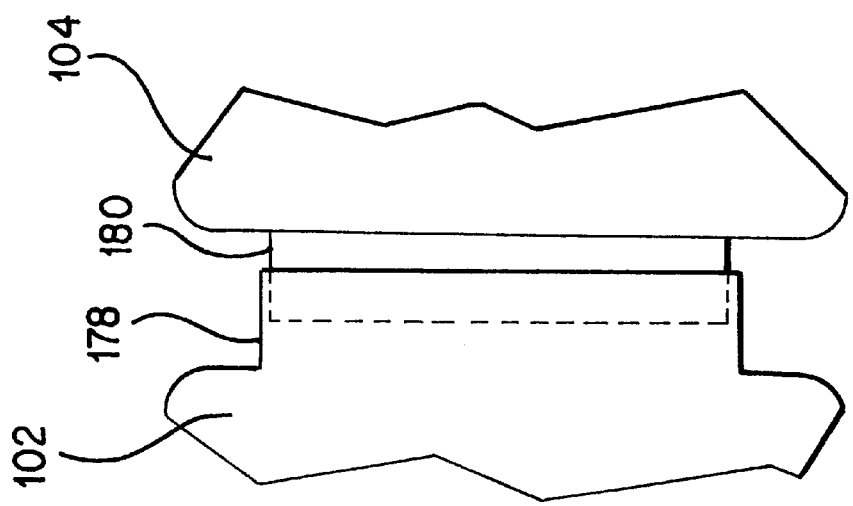
FIG. 3B is a cut-away enlarged plan view showing the joining of the coupling members of the present invention.
Figure 3C:
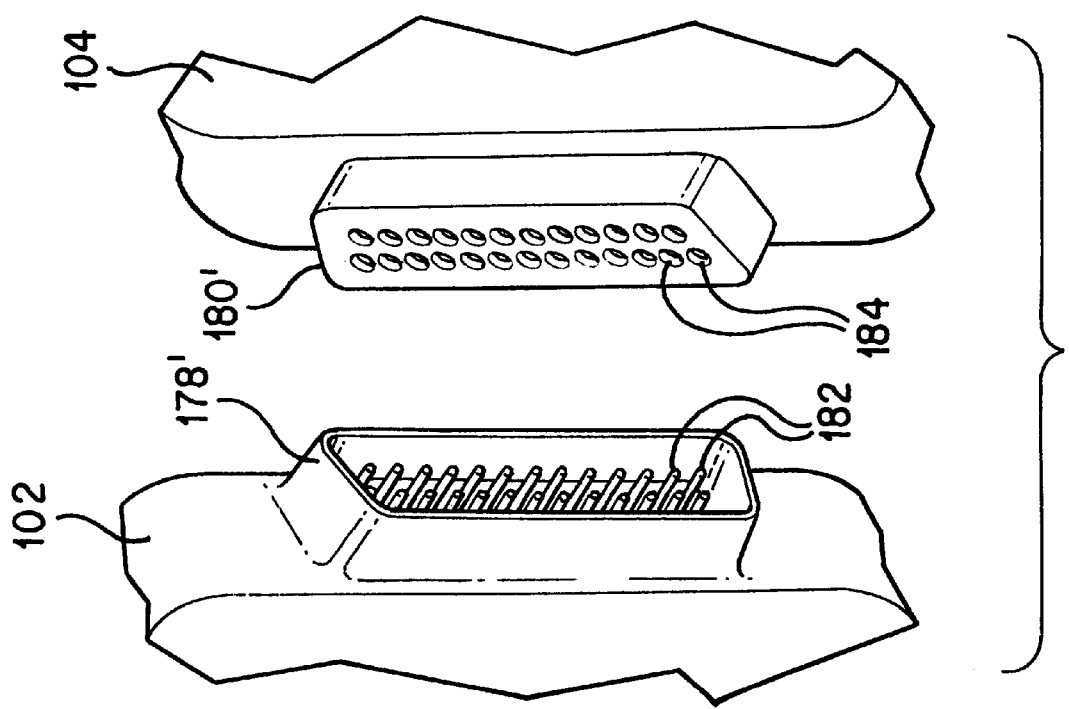
FIG. 3C is a cut-away enlarged perspective view showing the coupling members of the present invention incorporating electric plug and socket connectors.

Referring now to FIGS. 3A and 3B, one method for coupling housing 102 to housing 104 is shown. Housing 102 includes a first connecting portion 178 which telescopically engages the second connecting portion 180 of housing 104. The tight fit between the first connecting portion 178 and the second connecting portion 180 provides a releasable coupling between housings 102 and 104 that permits the housings to be integrally joined, when so desired, and subsequently easily separated into the separate hand grippable units. The connecting portions may be provided in an alternate configuration 178', 180', wherein an electrical connection may also be made therebetween when the connecting portions 178', 180' are telescopically engaged. The electrical connection is not required between the two hand grippable units, but is utilized in conjunction with an adaptor to be described in following paragraphs. However, to avoid interference with the output circuitry coupled to the connector pins 182 and connector socket connections 184, a pair of the pins 182 and socket connections 184 form a switch 215 which disables output to the other pins and connector socket connections. Thus, as shown in FIG. 6, where the connectors 178', 180' are utilized, the digital bus 222 is coupled through gate circuitry 230 to the appropriate connector 178', 180'. However, when the connectors 178' and 180' are connected together, such completes a circuit between the ground connection 232 and gate circuitry 230, the interconnection between the pairs of pins 182 and connector socket connections 184 defining a switch 215 which signals the gate circuitry to disable connection of the bus 222 to the connectors 178' and 180'. To understand how this switch is established, consider the pins 182 having the connector positions 1 and 2 as being associated with the switch 215 and the corresponding connector socket connections 184 of positions 1 and 2 similarly being associated with the switch 215. It should also be understood that the ground connection 232 within each hand grippable unit are connected together through another pin and connector socket connection, for instance, the connector position 15 in each of the connectors 178' and 180'. The pin 182 having the connector position 1 of connector 178' is connected to the ground connection 232, wherein the connector socket connection 184 having the corresponding 1 position in connector 180' is connected to the gate circuitry 230 within the housing 104. The connector socket connection 184 of position 2 of connector 180' is connected to the ground connection 232, and the pin 182 located in position 2 of connector 178' is coupled to the gate circuitry 230 within the housing 102. Thus, when the connectors 178' and 180' are coupled together, the ground connections provided through the circuitry in one of the housings 102, 104, made common through connector positions 15, are respectively coupled to the gate circuitry 230 in the other housing 104, 102, disabling the transmission of signals from bus 222 to the respective connectors.

Figure 7:
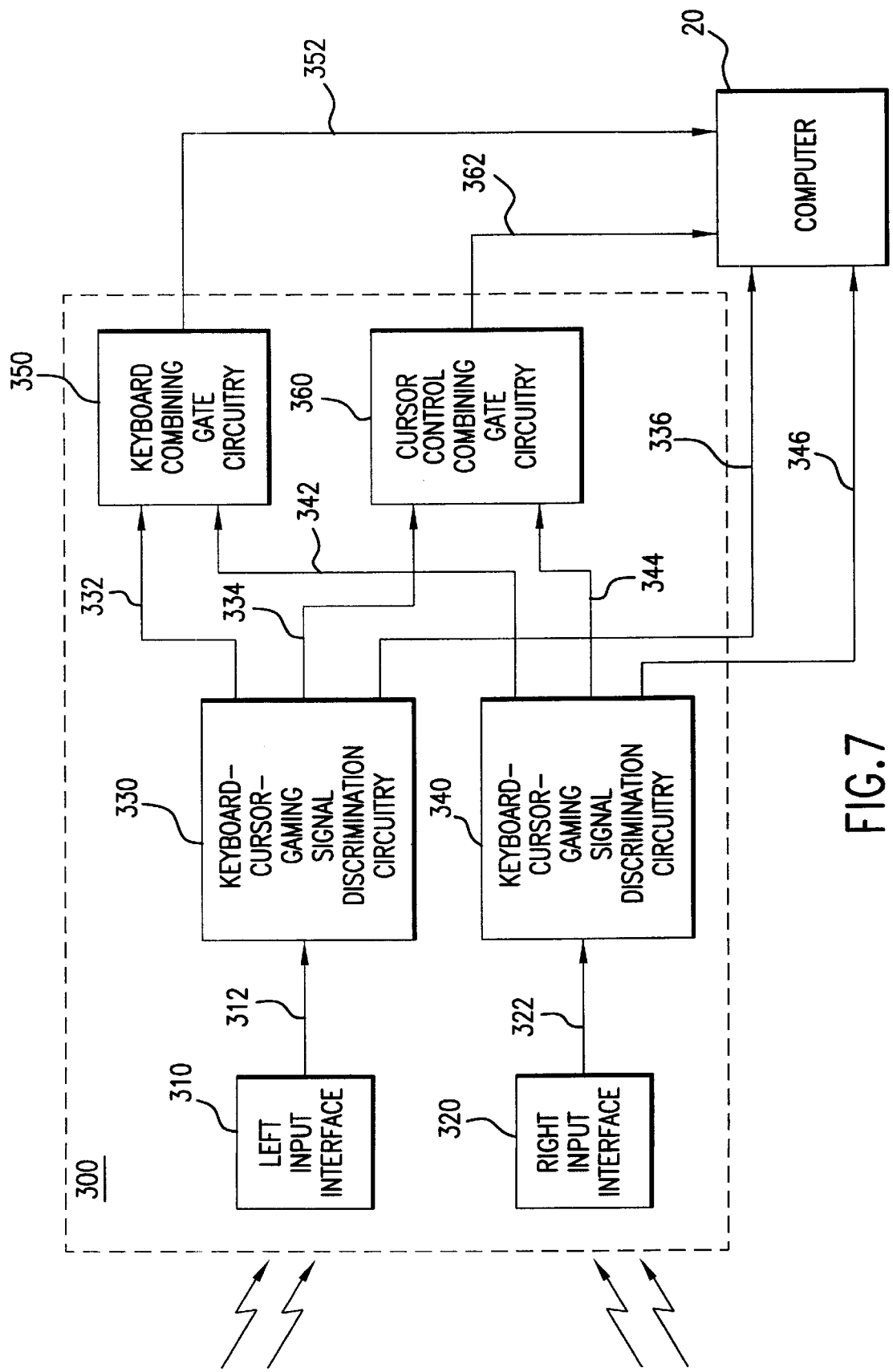
FIG. 7 is a circuit block diagram for interface circuitry of the present invention; and, FIG. 8 is a circuit block diagram for the adaptor of the present invention.

Referring now to FIG. 7, there is shown the computer interface circuit 300 which provides the interface between the output interface circuits 224 of each of the hand grippable units and a computing device 20. The output interface circuit 224 contained within each of the housings 102, 104 communicates on a distinct and separate channel from the other output interface circuit. Hence, each of the output interface circuits 224 within the respective housings 102 and 104 encodes the digital signals representing the character codes, function codes, symbology coding, cursor control coding, and game control codes utilizing different encoding schemes, or are differently modulated, or otherwise made distinguishable one from another to define two distinct communication channels, distinguishable to the respective left and right input interface circuits 310 and 320. Each of the left input interface circuit 310 and right input interface circuit 320 perform a format conversion on the received signals, for instance, where the received signals are optical signals, such are converted to electrical signals, or where the input signals are radio frequency signals, such are demodulated to provide the baseband electrical signals.

The electrical signals output from interface circuit 310 are coupled to a keyboard cursor-gaming signal discrimination circuit 330 through a coupling line 312. Similarly, the output from the interface circuit 320 are coupled to a keyboard cursor-gaming signal discrimination circuit 340 through coupling line 322. The purpose of circuitry 330 and 340 is to separate keyboard signals from cursor control signals from gaming signals, as such signals are delivered to different ports of the computer 20. The type of signal transmitted is incorporated into the transmitted coded signals to be identified by circuits 330, 340. The keyboard signals are output from circuit 330 coupled to the keyboard combining gate circuitry 350 through coupling line 332, the keyboard combining gate circuitry receiving an input from the discrimination circuitry 340 through coupling line 342. Keyboard combining gate circuitry 350 couples the keyboard character, functions, and symbol codes input from one or the other of the discrimination circuits 330 and 340 to the keyboard port of computer 20 through the coupling line 352.

Similarly, the cursor control signals output from circuitry 330 is coupled to the cursor control combining gate circuitry 360 through coupling line 334 and the cursor control signals output from discrimination circuitry 340 is coupled to the gate circuitry 360 through coupling line 344. Combining gate circuitry 360 couples the cursor control signals output from one of the discrimination circuits 330, 340 to the computer's mouse or serial port through the coupling line 362. In order to avoid conflicts, both the keyboard combining gate circuitry 350 and cursor control combining gate circuitry 360 lock out inputs from one of the discrimination circuits when a signal is received from the other discrimination circuit. Gaming signals discriminated in circuits 330 and 340 are directly coupled to computer 20, to a game controller input port, USB port, parallel port, or the like, depending on the computer and software being utilized therein.

Referring now to FIG. 4, there is shown the hand grippable combined keyboard and game controller system 100' which can communicate with a computer 20, as previously described, as well as a palm/tablet sized computing device 10 which is received within an adaptor 210. Adaptor 210 is provided with an opening 212 into which the computing device 10 is received. Adaptor 210 is provided with connecting portions 214 and 216 which respectively matingly engage with connecting portions 180, 180' of housing 104 and 178, 178' of housing 102. Each of the hand grippable units may communicate with the computing device 10 through a wireless data link, such as by radio frequency, utilizing the "blue tooth" standard. Alternately, a hard wire connection can be provided through the use of connectors.

Figure 8:
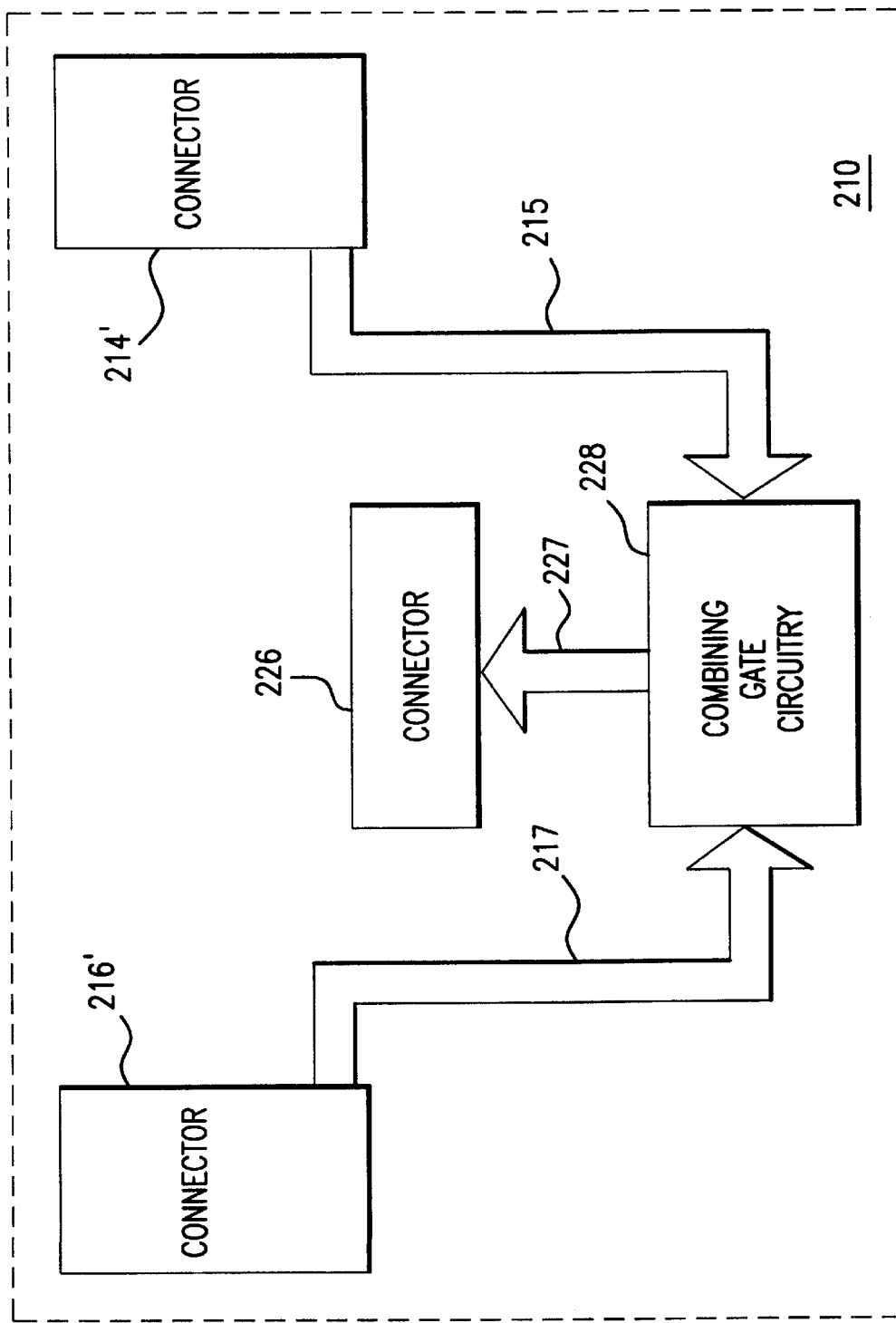

As previously discussed, housing 102 may be provided with a connector 178' having a plurality of pins 182 and housing 102 may be provided with a connector 180' having a plurality of connector socket connections 184. Adaptor 210 is provided with complementary connectors 214' and 216' for receiving the keystroke signals from each hand grippable unit and transferring such to a docking connector within the adaptor 210 which mates with a corresponding connector of the computing device 10. As shown in FIG. 8, signals from the connector 216' are coupled to the combining gate circuitry 228 through the bus 217. Similarly, signals are transferred from the connector 214' to the combining gate circuitry 228 through the bus 215. Combining gate circuitry 228 transfers the character, function, and symbol codes generated by each of the hand grippable units to the bus 227 which provides those codes to the computing device docking connector 226, for input to computing device 10.

Turning back now to FIG. 6, there is shown an optional switch 218 which provides an input to the output interface circuit 224. Switch 218 is included in adaptor 210, and may be formed in a manner similar to that of switch 215, as previously described, or may be a microswitch that is enabled by the insert of the computing device 10 into the opening 212. When switch 218 is operated, such disables the output interface circuit, the output of which is not required as a result of the coupling of signals to the connector 178', 180', thereby conserving battery power. Alternately, switch 218 can be utilized in place of switch 215, providing an enabling signal to gate circuitry 230 responsive to coupling of the adaptor 210 to the respective housing 102, 104 or receipt of the computing device 10 within the opening 212 of adaptor 210. In that configuration, the output interface circuit 224 can remain enabled when the adaptor and computing device are in use or, by appropriate connection, be disabled when gate circuitry 230 is enabled.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A hand grippable combined keyboard and game controller system, comprising:

a pair of housings each being respectively contoured to be grasped by a corresponding one of a user's two hands, each of said housings having a first surface portion accessible to the user's thumb and a hand grip portion engageable my the user's fingers;

a plurality of first control switches disposed on said first surface portion of a first of said pair of housings for operation by a respective one of the user's thumbs to output signals representing a first portion of alphabetic characters of an alphabet;

a plurality of second control switches disposed on said first surface portion of a second of said pair of housings for operation by the other of the user's thumbs to output signals representing a second portion of alphabetic characters of the alphabet;

a plurality of third control switches disposed on said hand grip portion of said first housing for operation by the user's fingers of an associated hand to output signals representing a third portion of alphabetic characters of the alphabet, each of said plurality of third control switches being disposed in correspondence with a particular one of the user's fingers of the associated hand; and, a plurality of fourth control switches disposed on said hand grip portion of said second housing for operation by the user's fingers of an associated hand to output signals representing a fourth portion of alphabetic characters of the alphabet, each of said plurality of fourth control switches being disposed in correspondence with a particular one of the user's fingers of the associated hand.

2. The system as recited in claim 1 where said plurality of first control switches includes a switch for output of a remapping signal for temporarily remapping said second portion of alphabetic characters to a corresponding portion of said plurality of first control switches and said fourth portion of alphabetic characters to a corresponding portion of said plurality of third control switches.

3. The system as recited in claim 1 where said plurality of second control switches includes a switch for output of a remapping signal for temporarily remapping said first portion of alphabetic characters to a corresponding portion of said plurality of second control switches and said third portion of alphabetic characters to a corresponding portion of said plurality of fourth control switches.

4. The system as recited in claim 1 where each of said third and fourth control switches are multidirectional switch assemblies and are each displaceable in different directions for respective output of signals representing different characters.

5. The system as recited in claim 1 where said plurality of first control switches includes a switch for output of a remapping signal for temporarily remapping said second portion of alphabetic characters to a corresponding portion of said plurality of first control switches and said fourth portion of alphabetic characters to a corresponding portion of said plurality of third control switches, said plurality of second control switches includes a switch for output of a remapping signal for temporarily remapping said first portion of alphabetic characters to a corresponding portion of said plurality of second control switches and said third portion of alphabetic characters to a corresponding portion of said plurality of fourth control switches.

6. The system as recited in claim 1 where each said housing includes a strap member extending across an outer extent of said hand grip portion for passing over a dorsal portion of the user's hand to aid in supporting said housing during use of said system.

7. The system as recited in claim 1 where one of said third control switches corresponding to the user's index finger is a four directional switch assembly, said one switch being displaceable in each of four different directions to output signals representing four different characters.

8. The system as recited in claim 1 where one of said fourth control switches corresponding to the user's index finger is a four directional switch assembly, said one switch being displaceable in each of four different directions to output signals representing four different characters.

9. The system as recited in claim 1 where said plurality of first control switches and said plurality of second control switches each include a respective cursor position control operator.

10. The system as recited in claim 1 where said plurality of first control switches includes at least two multidirectional switch assemblies and operators thereof are each displaceable in different directions for respective output of different signals.

11. The system as recited in claim 1 where said first housing includes a first coupling member and said second housing includes a second coupling member, said second coupling member cooperating with said first coupling member to releasably join said first housing to said second housing and thereby form a single integral structure.

12. The system as recited in claim 11 further comprising a mounting adapter having an opening for receiving a computing device therein, said mounting adapter having a third coupling member on one side thereof adapted for releasable coupling to said first coupling member and a fourth coupling member on an opposing side of said mounting adapter adapted for releasable coupling to said second coupling member.

13. The system as recited in claim 1, wherein said first portion of alphabetic characters, said second portion of alphabetic characters, said third portion of alphabetic characters, and said fourth portion of alphabetic characters together represent all alphabetic characters of the alphabet and are respectively generated by said plurality of first control switches, said plurality of second control switches, said plurality of third control switches, and said plurality of fourth control switches without chording.

14. The system as recited in claim 13 where said first portion of alphabetic characters are defined by the characters v, x, and z, and said second portion of alphabetic characters are defined by the characters h, 1, b, d, and q.

15. The system as recited in claim 14 where said third portion of alphabetic characters are defined by the characters p, k, t, y, e, u, i, w, and s, and said fourth portion of alphabetic characters are defined by the characters r, c, n, m, a, f, o, j, and g.

16. The system as recited in claim 13 where said first portion of alphabetic characters are defined by the characters v, x, and z, and said second portion of alphabetic characters are defined by the characters c, l, y, k, and j.

17. The system as recited in claim 16 where said third portion of alphabetic characters are defined by the characters u, m, n, h, i, o, b, and p, and said fourth portion of alphabetic characters are defined by the characters a, q, s, w, e, d, t, g, f, and r.

18. The system as recited in claim 1 where said plurality of first control switches include a mode control switch for changing an encoding of signals output by a portion of said plurality of first control switches and a portion of said plurality of third control switches from output of signals representing keyboard functions to game control functions, said plurality of second control switches including a mode control switch for changing an encoding of signals output by a portion of said plurality of second control switches and a portion of said plurality of fourth control switches from output of signals representing keyboard functions to game control functions.

19. A hand gripable combined keyboard and game controller system, comprising:
a first housing and a second housing, each of said first and second housings being respectively contoured to be grasped by a corresponding one of a user's two hands, each of said first and second housings having a first surface portion accessible to the user's thumb and a hand grip portion engageable my the user's fingers;
a plurality of first control switches disposed on said first surface portion of said first housing for operation by a respective one of the user's thumbs to output signals representing a first portion of alphabetic characters of an alphabet;
a plurality of second control switches disposed on said first surface portion of said second housing for operation by the other of the user's thumbs to output signals representing a second portion of alphabetic characters of an alphabet;
a plurality of third control switches disposed on said hand grip portion of said first housing for operation by the user's fingers of an associated hand to output signals representing a third portion of alphabetic characters of the alphabet, each of said plurality of third control switches being disposed in correspondence with a particular one of the user's fingers of the associated hand; and,
a plurality of fourth control switches disposed on said hand grip portion of said second housing for operation by the user's fingers of an associated hand to output signals representing a fourth portion of alphabetic characters of the alphabet, each of said plurality of fourth control switches being disposed in correspondence with a particular one of the user's fingers of the associated hand, wherein said first portion of alphabetic characters, said second portion of alphabetic characters, said third portion of alphabetic characters, and said fourth portion of alphabetic characters together represent all alphabetic characters of the alphabet and are respectively generated by said plurality of first control switches, said plurality of second control switches, said plurality of third control switches, and said plurality of fourth control switches without chording.

20. The system as recited in claim 19 where said plurality of first control switches includes a switch for output of a remapping signal for temporarily remapping said second portion of alphabetic characters to a corresponding portion of said plurality of first control switches and said fourth portion of alphabetic characters to a corresponding portion of said plurality of third control switches, said plurality of second control switches including a switch for output of a remapping signal for temporarily remapping said first portion of alphabetic characters to a corresponding portion of said plurality of second control switches and said third portion of alphabetic characters to a corresponding portion of said plurality of fourth control switches.

21. The system as recited in claim 19 where said first housing includes a first coupling member and said second housing includes a second coupling member, said second coupling member cooperating with said first coupling member to releasably join said first housing to said second housing and thereby form a single integral structure.

22. The system as recited in claim 21 further comprising a mounting adapter having an opening for receiving a computing device therein, said mounting adapter having a third coupling member on one side thereof adapted for releasable coupling to said first coupling member and a fourth coupling member on an opposing side of said mounting adapter adapted for releasable coupling to said second coupling member.

23. The system as recited in claim 19 where each of said third and fourth control switches are multidirectional switch assemblies and each includes an operator displaceable in different directions for respective output of signals representing different characters.

24. The system as recited in claim 19 where said first portion of alphabetic characters are defined by the characters v, x, and z, and said second portion of alphabetic characters are defined by the characters h, l, b, d, and q.

25. The system as recited in claim 24 where said third portion of alphabetic characters are defined by the characters p, k, t, y, e, u, i, w, and s, and said fourth portion of alphabetic characters are defined by the characters r, c, n, m, a, f, o, j, and g.

26. The system as recited in claim 19 where said first portion of alphabetic characters are defined by the characters v, x, and z, and said second portion of alphabetic characters are defined by the characters c, l, y, k, and j.

27. The system as recited in claim 26 where said third portion of alphabetic characters are defined by the characters u, m, n, h, i, o, b, and p, and said fourth portion of alphabetic characters are defined by the characters a, q, s, w, e, d, t, g, f, and r.

28. The system as recited in claim 19 where said plurality of first control switches include a mode control switch for changing an encoding of signals output by a portion of said plurality of first control switches and a portion of said plurality of third control switches from output of signals representing keyboard functions to game control functions, said plurality of second control switches including a mode control switch for changing an encoding of signals output by a portion of said plurality of second control switches and a portion of said plurality of fourth control switches from output of signals representing keyboard functions to game control functions.

29. A hand gripable combined keyboard and game controller system, comprising:

a pair of housings each being respectively contoured to be grasped by a corresponding one of a user's two hands, each of said housings having a first surface portion accessible to the user's thumb and a hand grip portion engageable my the user's fingers;

a plurality of first control operators disposed on said first surface portion of a first of said pair of housings for operation by a respective one of the user's thumbs to output signals representing a first portion of alphabetic characters of an alphabet;

a plurality of second control operators disposed on said first surface portion of a second of said pair of housings for operation by the other of the user's thumbs to output signals representing a second portion of alphabetic characters of the alphabet;

a plurality of third control operators disposed on said hand grip portion of said first housing for operation by the user's fingers of an associated hand to output signals representing a third portion of alphabetic characters of the alphabet, each of said plurality of third control operators being disposed in correspondence with a particular one of the user's fingers of the associated hand; and, a plurality of fourth control operators disposed on said hand grip portion of said second housing for operation by the user's fingers of an associated hand to output signals representing a fourth portion of alphabetic characters of the alphabet, each of said plurality of fourth control operators being disposed in correspondence with a particular one of the user's fingers of the associated hand, said plurality of first control operators including an operator for output of a remapping signal for temporarily remapping said second portion of alphabetic characters to a corresponding portion of said plurality of first control operators and said fourth portion of alphabetic characters to a corresponding portion of said plurality of third control operators, said plurality of second control operators including an operator for output of a remapping signal for temporarily remapping said first portion of alphabetic characters to a corresponding portion of said plurality of second control operators and said third portion of alphabetic characters to a corresponding portion of said plurality of fourth control operators.

30. A hand gripable combined keyboard and game controller system, comprising:

a first housing and a second housing, each of said first and second housings being respectively contoured to be grasped by a corresponding one of a user's two hands, each of said first and second housings having a first surface portion accessible to the user's thumb and a hand grip portion engageable my the user's fingers, said first housing including a first coupling member and said second housing including a second coupling member, said second coupling member cooperating with said first coupling member to releasably join said first housing to said second housing and thereby form a single integral structure;

a plurality of first control operators disposed on said first surface portion of said first housing for operation by a respective one of the user's thumbs to output signals representing a first portion of alphabetic characters of an alphabet;

a plurality of second control operators disposed on said first surface portion of said second housing for operation by the other of the user's thumbs to output signals representing a second portion of alphabetic characters of the alphabet;

a plurality of third control operators disposed on said hand grip portion of said first housing for operation by the user's fingers of an associated hand to output signals representing a third portion of alphabetic characters of the alphabet, each of said plurality of third control operators being disposed in correspondence with a particular one of the user's fingers of the associated hand; and, a plurality of fourth control operators disposed on said hand grip portion of said second housing for operation by the user's fingers of an associated hand to output signals representing a fourth portion of alphabetic characters of the alphabet, each of said plurality of fourth control operators being disposed in correspondence with a particular one of the user's fingers of the associated hand.

* * * * *